March 16, 1954 — M. W. BARNES — 2,672,130
CIRCULAR UPDRAFT HEATER
Filed Sept. 13, 1952
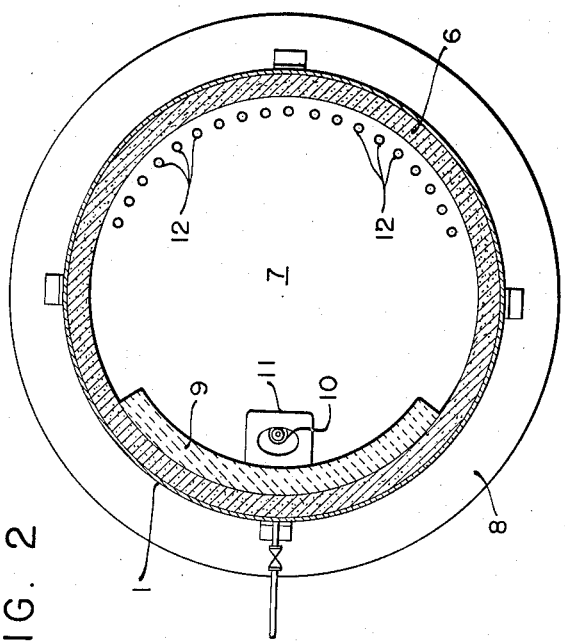
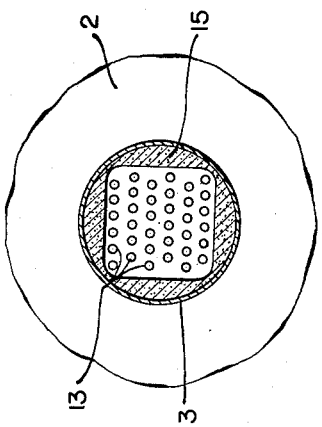
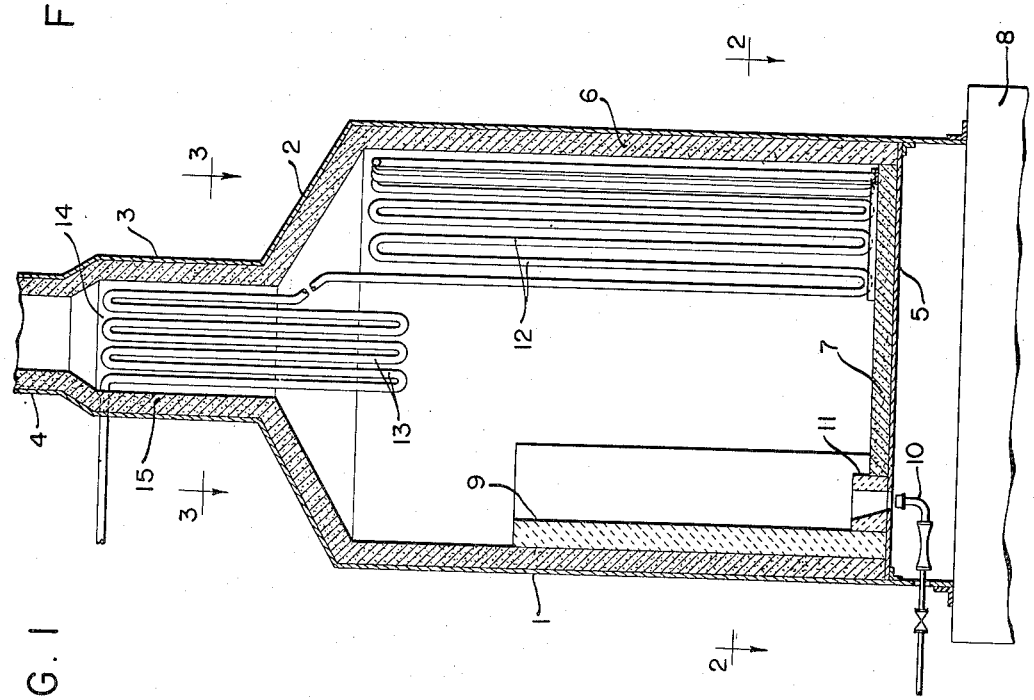
INVENTOR:
MARION W. BARNES
BY: Chester J. Giuliani
Philip T. Liggett
ATTORNEYS Patented Mar. 16, 1954

2,672,130

UNITED STATES PATENT OFFICE 2,672,130

CIRCULAR UPDRAFT HEATER

Marion W. Barnes, Wilmette, Ill., assignor to Universal Oil Products Company, Chicago, Ill., a corporation of Delaware Application September 13, 1952, Serial No. 309,484

2 Claims. (Cl. 122—356)

This invention relates to an improved and a simplified type of updraft heater and more particularly to a compact cylindrical heater providing reflected radiant heat for conduits positioned within the lower portion of the heater chamber.

There are various types of heaters having a cylindrical shape with tubular members placed vertically along the inner periphery of the furnace chamber, however, the usual circular heater has one or more burners directed upwardly through the center portion of the chamber so that the only radiant heat to the tubes is the direct radiation from the flames. In other words, the total heating supplied to the tubular members comprises a minor amount of radiant heating along with some convection heating, and there is no heated wall surface within the lower portion of the chamber which provides high temperature radiation and a resulting more efficient high temperature heating of the tubular members. It is recognized that a compact heater is generally more economical to construct and easier to erect than the rectangular or box-shaped heaters. Thus, where there is a cylindrical construction and arrangement which provides improved radiant heating, as provided by the present invention, there is a distinct advantage over the prior types of circular heater.

Briefly, the modified heater construction of this invention which provides improved radiant heating for the tubular fluid members therein, comprises in combination, a continuous cylindrical refractory wall forming the periphery of a furnace chamber, and refractory floor and roof portions forming with the cylindrical wall a confined cylindrical furnace chamber, a flue gas outlet passageway extending from the chamber, a heat reflecting refractory wall having a curved or arcuate shaped horizontal cross section extending along a portion of the cylindrical wall within the furnace chamber, burner means extending into the chamber and arranged to impinge hot flame and combustion gas against the reflecting wall, a plurality of spaced fluid conduits positioned within the furnace chamber along a portion of the refractory cylindrical wall opposing the arcuate reflecting wall, whereby high temperature reflected radiant heat may be provided for the fluid heating.

The tubular members positioned within the furnace chamber may be vertically or horizontally positioned, however, preferably each of the conduits or tubular members is positioned vertically and spaced from one another in a tube bank which extends in a semi-circular or arcuate arrangement along the inside of the cylindrical wall of the furnace chamber. The flue gas outlet passageway from the heater chamber is preferably extended upwardly from the top portion of the chamber so that there is a direct upward flow of the resulting combustion gas and very little if any convection heating of the wall tubes in the lower portion of the furnace chamber. One or more banks of convection heated tubes may, however, be positioned within the upper portion of the chamber and extend into the flue gas outlet passageway.

Various types of construction may be utilized in forming the walls of the furnace chamber proper. Heat resistant fire bricks may be used to form the refractory furnace walls, as well as the refractory heating reflecting wall, or various types of insulating concretes and like materials which may be formed into a monolithic type of construction. Such liners may also be pre-formed such that the furnace chamber is erected in sections, or such lining materials may be attached to or connected with a steel shell after the latter has been erected in place.

The construction features and advantages of the present invention may be better described and explained in connection with the accompanying drawing which shows one embodiment of the cylindrical updraft heater.

Figure 1 of the drawing is a diagrammatic cross sectional elevational view through the heating chamber.

Figure 2 of the drawing is a sectional plan view as indicated by the line 2—2 in Figure 1 of the drawing.

Figure 3 is a sectional plan view of the upper flue gas outlet portion of the heater, as indicated by the line 3—3.

Referring now to the drawing, there is shown a heater having a metal outer wall shell 1, a sloping upper portion 2, which in turn connects with a smaller diameter upper cylindrical portion 3. The latter connects with an upper stack portion 4, while bottom plate 5 extends horizontally within the lower portion of the shell 1 and thereby forms a confined heating zone.

The interior of the metal wall or shell portions is indicated as being lined with a monolithic type of refractory 6, such as for example, an insulating concrete containing vermiculite aggregate. Similarly the bottom sheet 5 is lined with insulating concrete of suitable refractory material 7. The entire heater is supported on a suitable foundation 8.

As is shown in both Figures 1 and 2 of the drawing, extending adjacent a portion of the inner wall liner 6 is a refractory heat reflecting wall 9 having an arcuate shaped horizontal cross section. The wall 9 extends vertically along a major portion of the height of the cylindrical wall section and is adapted to be heated to a high temperature by suitable burner means supplying flame and combustion gas to its internal surface. The present embodiment indicates diagrammatically a single burner 10 extending upwardly from the bottom portion of the furnace chamber and through burner block 11 so that resulting high temperature flame and combustion gases are directed against the inner surface of the wall. It may be noted however, that additional burners may well be utilized along an extended length of curved reflecting wall within a relatively large diameter heater. Opposing the heated refractory wall 9, are a plurality of spaced fluid conduits or tubes 12, which are subjected to high temperature radiant heat from the inner curved wall surface of the arcuate wall 9. The tubes 12 are, as indicated here, preferably positioned vertically and spaced from one another in a curved or arcuate row such that the radiant heat from wall 9 is reflected diametrically to opposing tubular members. However, multiple rows of tubes positioned vertically and arranged in a staggered formation may well be utilized along the cylindrical wall of the chamber. Alternatively, a plurality of curved horizontal tubes may be spaced vertically and positioned adjacent the inside of the cylindrical wall of the furnace chamber in a manner opposing the arcuate shaped heat reflecting wall 9.

The heating obtained by this arrangement is far more efficient than the aforementioned circular type of heater utilizing centrally positioned burners and having no inner walls or heat reflecting surfaces. The high temperature which can be built up along the inner surface of the arcuate wall 9 in turn permits high temperature reflected radiant heating to the plurality of wall tubes in the lower radiant heating zone of the furnace chamber. It is also to be noted that the present arrangement directs the flame and combustion gases along but one side of the furnace chamber and away from the surfaces of the tubular members 12 so that there is substantially no convection heating of these tubes and no flow of corrosive gases or combustion products in contact with the tubes.

As shown in connection with Figures 1 and 3 of the drawing, the present embodiment provides for a plurality of convection heated tubular members 13 in a relatively compact tube bank arrangement that is positioned vertically within the upper portion of the furnace chamber. The present embodiment also indicates a restricted cross sectional area flue gas passageway 14 having a substantially square cross section, the latter being formed by the upper refractory liner material 15. The tube bank, comprising members 13, extends upwardly into the passageway 14 such that the hot combustion gases passing through the restricted space impart a maximum amount of heat transfer to the tubular members. The fluid flow through the plurality of tubes 13 may be in series or parallel, as may be desired, and the resulting heated stream may in turn pass into the tube bank provided by tubes 12 within the radiant heating section, or alternatively, different fluid streams may be heated separately within the radiant and convection tube banks. It may also be noted that two or more fluid streams may be heated within separate portions of the arcuate tube bank formed by tubular members 12 particularly where it is desirable that more than one stream be subjected to high temperature radiant heating.

I claim as my invention:

1. A heater for fluids providing reflected radiant heating and comprising in combination, a continuous cylindrical wall having an outer metallic shell and an inner monolithic refractory liner forming the periphery of a furnace chamber, a lined floor connecting with the lower end portion of said cylindrical wall portion forming a lower furnace chamber, a reduced cross section convection heating passageway section extending upwardly from the upper portion of said furnace chamber, a flue gas stack extending upwardly from said passageway section, a separate arcuate shaped refractory wall positioned adjacent the monolithic liner of a portion of said cylindrical wall of said lower chamber, burner means extending into said chamber upwardly through the lower floor portion thereof and arranged to direct flame and hot gases upwardly along the inner surface of said arcuate reflecting wall, a plurality of vertically positioned conduits within said furnace chamber arranged in an arcuate shaped tube bank opposing said arcuate reflector wall, whereby the fluid stream within said bank of conduits is subjected to high temperature radiant heat reflected substantially diametrically from said arcuate wall.

2. A heater for fluids providing reflected radiant heat and comprising in combination, a continuous cylindrical wall having an outer shell and an inner monolithic refractory liner forming the periphery of a furnace chamber, a lined floor connecting with the lower end portion of said cylindrical wall and forming a lower furnace chamber, a reduced cross-section convection heating section extending upwardly from the upper portion of the lower furnace chamber, a flue gas stack extending upwardly from said convection heating section, a separate arcuate shaped refractory wall positioned adjacent the monolithic liner of a portion of the cylindrical wall of said lower furnace chamber, burner means extending upwardly through the lower floor portion of said lower furnace chamber and arranged to direct flame and hot gases upwardly over said arcuate reflecting wall, a plurality of vertically positioned convection heated tubes in spaced relationship in a tube bank disposed within said convection heating section and means connecting said tubes in series flow, a plurality of spaced and vertically positioned radiant heated tubes arranged in an arcuate tube bank opposing said arcuate refractory wall, means connecting last said tubes in series flow and means connecting said convection heated tube back with the radiantly heated arcuate tube bank whereby a fluid stream is subjected to similar heating conditions within each tube of each of the separate tube banks within said heater.

MARION W. BARNES.

References Cited in the file of this patent
UNITED STATES PATENTS

| Number | Name | Date |
|---|---|---|
| 2,223,379 | Mekler | Dec. 3, 1940 |
| 2,258,235 | Barnes | Oct. 7, 1941 |
| 2,294,977 | Garrison et al. | Sept. 8, 1942 |